US005748208A

United States Patent [19]

Uchiyama et al.

[11] Patent Number: 5,748,208

[45] Date of Patent: May 5, 1998

[54] COLOR INK JET RECORDING METHOD

[75] Inventors: Yaeko Uchiyama, deceased, late of Suwa, by Kazuhiro Uchiyama, sole heir; Masaaki Itano, Suwa; Hiroko Hayashi, Suwa, all of Japan

[73] Assignee: Seiko Epson Corporation, Tokyo-to, Japan

[21] Appl. No.: 182,017

[22] PCT Filed: May 24, 1993

[86] PCT No.: PCT/JP93/00680

§ 371 Date: Apr. 19, 1994

§ 102(e) Date: Apr. 19, 1994

[87] PCT Pub. No.: WO93/24330

PCT Pub. Date: Dec. 9, 1993

[30] Foreign Application Priority Data

| | | | |
|---|---|---|---|
| May 22, 1992 | [JP] | Japan | 4-130269 |
| Jun. 11, 1992 | [JP] | Japan | 4-152385 |
| Sep. 10, 1992 | [JP] | Japan | 4-242221 |
| Dec. 28, 1992 | [JP] | Japan | 4-348848 |

[51] Int. Cl.$^6$ .............................. B41J 2/21; G01D 11/00

[52] U.S. Cl. .............................. 347/43; 347/100

[58] Field of Search .............................. 347/43, 98, 100, 347/15; 358/529

[56] References Cited

U.S. PATENT DOCUMENTS

| | | | |
|---|---|---|---|
| 4,957,553 | 9/1990 | Koike et al. | 106/20 |
| 5,059,984 | 10/1991 | Moore et al. | 347/43 |
| 5,075,699 | 12/1991 | Koike et al. | 346/1.1 |
| 5,184,148 | 2/1993 | Suga et al. | 347/180 |
| 5,371,531 | 12/1994 | Rezanka et al. | 347/43 |
| 5,428,377 | 6/1995 | Stoffel et al. | 347/15 |

FOREIGN PATENT DOCUMENTS

| | | |
|---|---|---|
| 60-174651 | 9/1985 | Japan . |
| 60-253550 | 12/1985 | Japan . |
| 62-223280 | 10/1987 | Japan . |
| 63-139964 | 6/1988 | Japan . |
| 1-204980 | 8/1989 | Japan . |
| 3-41171 | 2/1991 | Japan . |
| 3-255173 | 11/1991 | Japan . |

*Primary Examiner*—Benjamin R. Fuller
*Assistant Examiner*—Thinh Nguyen
*Attorney, Agent, or Firm*—Ladas & Parry

[57] ABSTRACT

A color ink jet recording method is provided which can provide a color image having a higher quality and attain a print quality of a black ink comparable to that of the conventional monochrome print. A color ink jet recording method for printing on a recording medium, comprising the steps of: when a portion to be black is in contact with a color portion in a color image to be formed, printing, first, at least one color ink on a portion which is a part of the portion to be black and is in contact with the color portion on the recording medium, then printing a black ink on a portion which is to be black and is partially printed with the color ink according to the previous step, wherein a plural of color inks having a surface tension at 20° C. of less than 40 dyn/cm and a black ink having a surface tension at 20° C. of 40 dyn/cm or more.

8 Claims, 2 Drawing Sheets

COLOR INK JET RECORDING METHOD

BACKGROUND OF THE INVENTION

1. Field of the Invention

The present invention relates to a method for forming a color image by an ink jet recording system.

2. Background Art

Color images are, in general, formed by employing individual colors of yellow, magenta, cyan and black. When dots of these colors are formed by an ink jet recording system, color mixing or flow of one color portion into other color portion in a portion where different colors (in particular, a black portion and a color portion) were in contact with each other means a deterioration in color images. Various proposals have been made for providing sharp color images as follows.

For example, Japanese Patent Laid-Open Nos. 197776/1985, 197777/1985 and 197778/1985 disclose that the deterioration in color images can be prevented by making compositions or properties of inks equal. The publications disclose that the deterioration in color images can be prevented by rendering inks equal to each other in respect of the time of fixation and degree of blurring on a recording material. In the inks described in the publications, however, the degree of blurring cannot be sufficiently reduced so that there is room for improvement in the color images. Furthermore, even in a color printer, a black print is desired to have a quality comparable to print by a conventional monochrome printer. However, the quality of black print formed with a black ink described in the above publications was inferior to that of prints formed with a monochrome printer.

Japanese Patent Laid-Open No. 41171/1991 discloses a method in which printing with a water-base color ink having a surface tension of 30 to 40 mN/m precedes printing with a water-base black ink having a surface tension of 45 to 73 mN/m. The publication describes that it is possible even in a color printer to realize a good black print having quality which is comparable to that of a conventional black print. However, even in this method, it is observed that the black ink "flows into" the color ink portion at a portion where the black portion is in close vicinity to the color portion. As the result, the sharpness of the outline of the black portion becomes unsatisfactory. This is because, when a portion to be black is in contact with the colored portion, there occurs a difference in penetrability of ink between the colored portion where a print has been already formed with a color ink and the portion where a black print is to be formed. Specifically, an ink is more easily penetrated into an portion where a print has been already formed with a color ink than into a portion where no print is formed yet (i.e., a portion to be rendered black). Therefore, when a black ink is applied to a portion in contact with a portion where a color ink has already been applied, the black ink is drawn or flows into the portion where the color ink has been applied. As the result, the sharpness of the color image becomes unsatisfactory. In order to prevent this phenomenon, it may be necessary to use special recording paper having a coated surface.

Thus, in the formation of a color image by an ink jet recording system, there is room for improvement.

SUMMARY OF THE INVENTION

Accordingly, an object of the present invention is to provide an ink jet recording method which can provide a high-quality color image.

Another object of the present invention is to provide a color ink jet recording method which can provide a black print-having a quality comparable to the conventional monochrome print.

The present inventors have now found that the objects can be attained by first printing a color ink to a portion to be rendered black and then printing a black ink to the portion. The present invention has been made based on this finding.

Specifically, the ink jet recording method for printing on a recording medium according to the present invention comprises the steps of:

when a portion to be black is in contact with a color portion in a color image to be formed, printing first at least one color ink on a portion which is a part of the portion to be black and is in contact with the color portion on a recording medium, printing a black ink on a portion which is to be black and is partially printed with the color ink according to the previous step, wherein a plural of color inks having a surface tension at 20° C. of less than 40 dyn/cm and a black ink having a surface tension at 20° C. of 40 dyn/cm or more.

PREFERRED EMBODIMENTS OF THE INVENTION

In respect of the formation of a color image using a plural of color inks, preferably yellow, magenta and cyan inks, and a black ink, the conventional color ink jet recording methods may be employed as the ink jet recording method according to the present invention, except for modifications which will be descried later.

The method according to the present invention is applied to a portion where a black portion is in contact with a color portion in a color image to be formed on a recording medium. For example, the present invention has advantages when a stripe pattern as shown in FIG. 1, in which a black portion 1 is adjacent to a color portion (for example, a yellow portion) 2, is formed.

Figure 1:
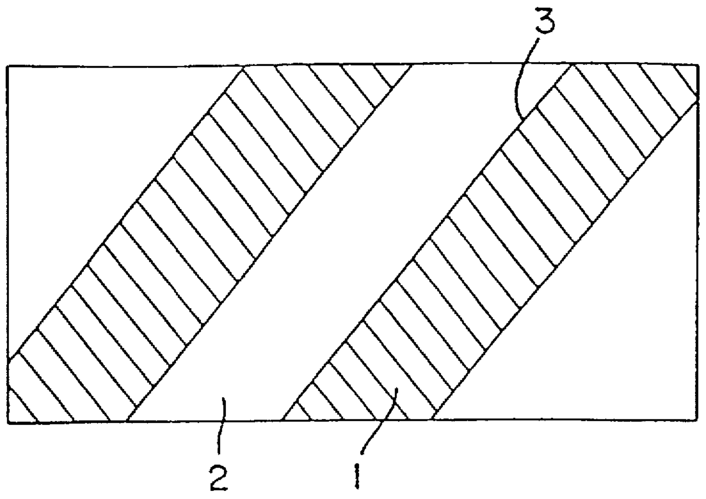
FIG. 1 is a schematic view of a portion where a black portion is in contact with a color portion, to which method according to the present invention is preferably applied.
Figure 2A:
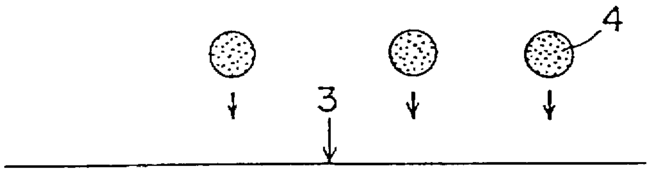
FIGS. 2(*a*)–2(*d*) is a schematic view showing the printing steps according to the method of the present invention.
Figure 2B:
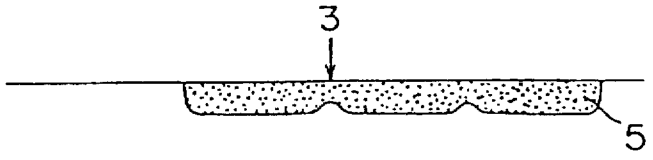
Figure 2C:
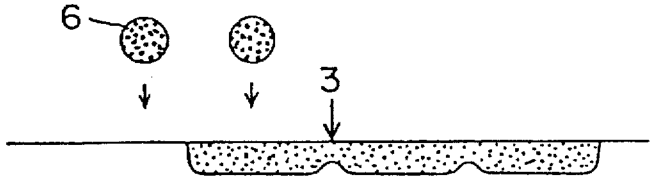
Figure 2D:
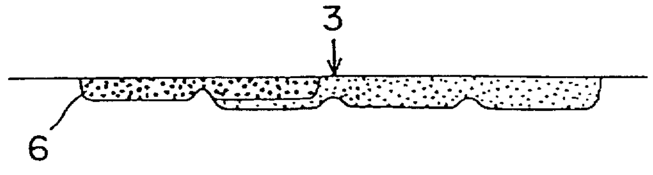

FIG. 2 is a schematic view showing the printing steps at a portion 3 (hereinafter referred to as "boundary") where the black portion 1 and the color portion 2 in FIG. 1 are in contact with each other. According to the method of the present invention, first, color ink droplets 4 are applied to a region corresponding to a color portion 2 with an ink jet recording system (FIG. 2 (*a*)). In this case, the color ink is also applied to a region of a black portion 1 beyond the boundary 3. The applied color ink is penetrated into the recording medium (region 5 in FIG. 2 (*b*)). Black ink droplets 6 are next applied to a region of the black portion 1 with the ink jet recording system (FIG. 2 (*c*)). On the recording medium, there is no difference in the penetrability of the ink between both sides of the boundary 3. Therefore, the force by which the applied black ink is drawn beyond the boundary 3 becomes relatively lower than the force by which the ink is vertically drawn into the recording medium. Consequently, there is no possibility that the black ink is flowed into the color portion remarkably beyond the boundary 3 (region 6 in FIG. 2 (*d*)). This enables a sharp color image to be realized.

Figure 3A:
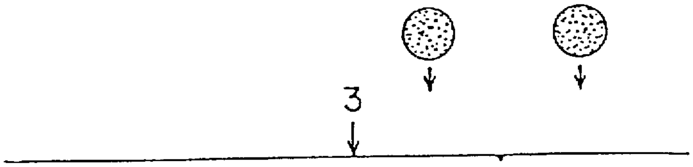
FIGS. 3*a*–3*c* is a schematic view showing the printing steps according a conventional method.
Figure 3B:
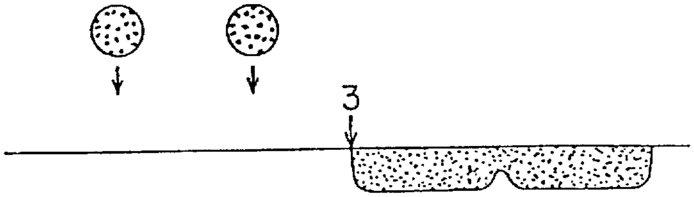
Figure 3C:
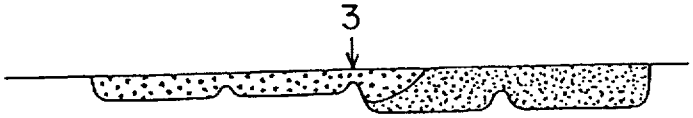

On the other hand, as shown in FIGS. 3*a*, 3*b*, 3*c*, in a conventional printing method, there is a difference in the penetrability of the ink into the recording medium between both sides of the boundary 3. The black ink is thus drawn into the portion to be colored beyond the boundary 3, which renders the color image dull. Accordingly, the present invention can effectively prevent the phenomenon that the black ink flows into the color portion beyond the boundary 3 as found in the conventional printing method as shown in FIG. 3.

As is apparent from the above, in the present invention, it is primarily important not to cause a difference in the penetrability of the ink into the recording medium between both sides of the boundary when a portion to be black is in contact with a portion to be colored. Therefore, there is no particular limitation on the color of the ink applied to a portion to be rendered black prior to applying a black ink to the portion. However, it is preferred to use an ink having the same color as the color portion in contact with the portion to be rendered black. For example, in the case of a strip pattern comprising yellow and black as shown in FIG. 1, the color of the ink applied beyond the boundary 3 is preferably yellow.

According to a preferred embodiment of the present invention, the weight ratio of black ink to color ink per dot is preferably in the range of 10:1 to 1:1, still preferably in the range of 5:1 to 1:1. When the weight ratio is in the range, the dot diameter of the black ink can be made identical to that of the color ink. When the weight ratio of the black ink to the color ink is less than 1, no black dot having a sufficient density can be provided, so that no sharp image can be formed. On the other hand, when the weight ratio of the black ink to the color ink exceeds 10, the dot of the black ink becomes excessively larger than the previously formed dot of the color ink, which unfavorably leads to a possibility that blurring occurs. The weight ratio in the above range is advantageous also in that the drying rate of the black ink can be made identical to that of the color ink.

In the method according to the present invention, the color ink may have a surface tension at 20° C. of less than 40 dyn/cm, preferably 25 to 35 dyn/cm, still preferably 26 to 32 dyn/cm, and the black ink may have a surface tension at 20° C. of 40 dyn/cm or more, preferably 45 to 65 dyn/cm, still preferably 50 to 60 dyn/cm. The composition of the ink is not particularly limited so far as the surface tensions are in the above ranges. Some conventional inks may be preferably used.

Since a difference in the penetrability into the recording medium, fixation time, etc. between color inks is not much favorable, it is preferred for the surface tensions of the color inks to be substantially the same. Therefore, still preferably, the color inks have the same or substantially the same composition except for the colorant.

Preferred examples of the colorant of the ink used in the method according to the present invention include water-soluble dyes, and specific examples thereof include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 241, 243 and 247;

C.I. Direct Violet 7, 9, 47, 48, 51, 66, 90, 93, 94, 95, 98, 100 and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397;

C.I. Acid Violet 5, 34, 43, 47, 48, 90, 103 and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227;

C.I. Acid Blue 9, 25, 40, 41, 62, 72, 76, 78, 80, 82, 92, 106, 112, 113, 120, 127, 129, 138, 143, 175, 181, 205, 207, 220, 221, 230, 232, 247, 258, 260, 264, 271, 277, 278, 279, 280, 288, 290 and 326;

C.I. Acid Black 7, 24, 29, 48, 52 and 172;

C.I. Reactive Red 3, 13, 17, 19, 21, 22, 23, 24, 29, 35, 37, 40, 41, 43, 45, 49 and 55;

C.I. Reactive Violet 1, 3, 4, 5, 6, 7, 8, 9, 16, 17, 22, 23, 24, 26, 27, 33 and 34;

C.I. Reactive Yellow 2, 3, 13, 14, 15, 17, 18, 23, 24, 25, 26, 27, 29, 35, 37, 41 and 42;

C.I. Reactive Blue 2, 3, 5, 8, 10, 13, 14, 15, 17, 18, 19, 21, 25, 26, 27, 28, 29 and 38;

C.I. Reactive Black 4, 5, 8, 14, 21, 23, 26, 31, 32 and 34;

C.I. Basic Red 12, 13, 14, 15, 18, 22, 23, 24, 25, 27, 29, 35, 36, 38, 39, 45 and 46;

C.I. Basic Violet 1, 2, 3, 7, 10, 15, 16, 20, 21, 25, 27, 28, 35, 37, 39, 40 and 48;

C.I. Basic Yellow 1, 2, 4, 11, 13, 14, 15, 19, 21, 23, 24, 25, 28, 29, 32, 36, 39 and 40;

C.I. Basic Blue 1, 3, 5, 7, 9, 22, 26, 41, 45, 46, 47, 54, 57, 60, 62, 65, 66, 69 and 71;

C.I. Basic Black 8.

It is also preferable to use pigments, and examples of the pigments include inorganic pigments, such as carbon black, and organic pigments, such as insoluble azo pigments, soluble azo pigments, phthalocyanine pigments, isoindolinone pigments, quinacridone pigments and perinone-perylene pigments. When the pigments are used as the colorant, the particle diameter is preferably 25 μm or less, still preferably 1 μm or less.

According to a preferred embodiment of the present invention, the black ink contains a pigment as the colorant, and the color inks contain a water-soluble dye as the colorant.

The content of the colorant in the ink can be properly determined by taking for instance, the printing density, clogging, jetting properties into consideration. In particular, when the black ink contains a pigment, the amount of the pigment added is preferably in the range of about 1 to 30% by weight, still preferably in the range of about 3 to 12% by weight, based on the ink. When the ink contains a water-soluble dye, the amount of the water-soluble dye added is preferably in the range of 0.3 to 25% by weight, still preferably in the range of 1 to 10% by weight, based on the ink.

When the pigment is used as the colorant, it is preferred to add a dispersant for the purpose of sufficiently dispersing the pigment. It is preferred to use as the dispersant known polymeric dispersants and surfactants commonly used for dispersing pigments in conventional inks containing pigments.

Preferred examples of the polymeric dispersant include natural polymers, and specific examples thereof include proteins such as glue, gelatin, casein and albumin; natural rubbers such as gum arabic and tragacanth rubber; glucosides such as saponin; alginic acid and alginic acid derivatives such as alginic acid propylene glycol ester, alginic acid triethanolamine and ammonium alginate; and cellulose derivatives such as methyl cellulose, carboxymethyl cellulose, polyethylene oxide, hydroxyethyl cellulose and ethylhydroxyethyl cellulose. Further preferred examples of the polymeric dispersant include synthetic polymers, and specific examples thereof include polyvinyl alcohols; polyvinyl pyrrolidones; acrylic resins such as polyacrylic acid, acrylic acid/acrylonitrile copolymer, potassium acrylate/acrylonitrile copolymer, vinyl acetate/acrylic ester copolymer and acrylic acid/alkyl acrylate copolymer; styrene/acrylic resins such as styrene/acrylic acid copolymer, styrene/methacrylic acid copolymer, styrene/methacrylic acid/alkyl acrylate copolymer, styrene/a-methylstyrene/acrylic acid copolymer and styrene/a-methylstyrene/acrylic acid/alkyl acrylate copolymer; styrene/maleic acid; styrene/maleic anhydride; vinylnaphthalene/acrylic acid copolymer; vinylnaphthalene/maleic acid copolymer; and vinyl acetate copolymers such as vinyl acetate/ethylene copolymer, vinyl acetate/fatty acid/vinylethylene copolymer, vinyl acetate/maleic ester copolymer, vinyl acetate/crotonic acid copolymer, vinyl acetate/acrylic acid copolymer. Among them, a copolymer of a monomer having a hydrophobic group with a monomer having a hydrophilic group and a polymer comprising a monomer having both a hydrophobic group and a hydrophilic group are particularly preferred.

Preferred examples of the surfactant as the dispersant include anionic surfactants such as salts of fatty acid, salts of higher alkyldicarboxylic acids, salts of sulfuric acid ester of higher alcohols, salts of higher alkylsulfonic acids, condensates of higher fatty acids with amino acids, salts of sulfosuccinic acid esters, salts of naphthenic acid, salts of sulfuric acid ester of liquid fatty oils and salts of alkylallylsulfonic acids; cationic surfactants such as salts of fatty acid amides, quaternary ammonium salts, sulfonium salts and phophonium; and nonionic surfactants such as polyoxyethylene alkyl ethers, polyoxyethylene alkyl esters, sorbitan alkyl esters and polyoxyethylene sorbitan alkyl esters.

The amount of these dispersants added is preferably in the range of 0.2 to 20% by weight, still preferably in the range of 1 to 10% by weight, based on the ink.

Although the ink used in the method according to the present invention may be basically a water-base ink, the ink preferably contains a water-soluble organic solvent in addition to water (preferably ion-exchanged water) as a solvent. Preferred examples of the water-soluble organic solvent include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or keto alcohols such as acetone and diacetinyl alcohol; ethers such as tetrahydrofuran and dioxane; alkylene glycols of which the alkylene group has 2 to 6 carbon atoms, such as ethylene glycol, propylene glycol, triethylene glycol, diethylene glycol, 1,2,6-hexanetriol, thiodiglycol and hexylene glycol; glycerin; polyalkylene glycols such as polyethylene glycol and polypropylene glycol; lower alkyl ethers of polyhydric alcohols, such as ethylene glycol monomethyl (or ethyl) ether, diethylene glycol monomethyl (or ethyl) ether and triethylene glycol monomethyl (or ethyl) ether; sulfolane; pyrrolidone; N-methyl-2-pyrrolidone; 1,3-dimethyl-2-imidazolidinone; 1,5-pentanediol; and mixtures of the above organic solvents. The addition of polyhydric alcohols is particularly preferred from the viewpoint of preventing nozzles from clogging. This is because the polyhydric alcohols prevent evaporation of water in the ink, which prevents the occurrence of a precipitate in the nozzles at their tips. Particularly preferred examples of the water-soluble organic solvent include polyhydric alcohols, such as diethylene glycol, and lower alkyl ethers of polyhydric alcohols, such as triethylene glycol monomethyl (or ethyl) ether. The amount of these water-soluble organic solvent added is preferably in the range of about 3 to 80% by weight, still preferably in the range of about 3 to 50% by weight, based on the ink.

Still preferably, the black ink contains a polyhydric alcohol in combination with a monohydric alcohol. This prevents the penetration and dispersion of an excessive amount of the ink into the recording medium to suppress blurring. This enables high-quality printing to be realized in plain paper. The amount of the monohydric alcohol added is preferably in the range of about 0.5 to 10% by weight based on the ink, and the amount of the polyhydric alcohol added is preferably in the range of 0.5 to 15% by weight based on the ink.

According to a further embodiment of the present invention, when a pigment is used as the colorant, it is preferred for the ink used in the method according to the present invention to contain a resin emulsion comprising a water-insoluble resin. The term "resin emulsion" used herein is intended to mean an emulsion comprising water as a continuous phase and the following resin component as a dispersed phase. Examples of the resin component as the dispersed phase include polyacrylic acid esters, polymethacrylic esters, acrylic resin, vinyl acetate resin, styrene-butadiene resin, vinyl chloride resin and acrylic-styrene resin.

According to a further preferred embodiment of the present invention, this resin is a polymer having both a hydrophilic portion and a hydrophobic portion. Although the particle diameter of the resin component is not particularly limited so far as the emulsion is formed, it is preferably about 150 nm or less, still preferably in the range of about 5 to 100 nm.

The above resin emulsions can be prepared by mixing the resin particles optionally together with a surfactant into water. For example, an emulsion of an acrylic resin or a styrene-acrylic resin can be prepared by mixing an (meth) acrylic ester or styrene, an (meth)acrylic ester and optionally together with (meth)acrylic acid and a surfactant in water. In general, the mixing ratio of the resin component to the surfactant is preferably in the range of about 10:1 to 5:1. When the amount of the surfactant used is smaller than the above range, it may be difficult to successfully prepare an emulsion. On the other hand, when it exceeds the above range, there may be a tendency that the water resistance of the ink is lowered or the penetrability is deteriorated. Although the surfactant is not particularly limited, preferred examples thereof include anionic surfactants (for example, sodium dodecylbenzenesulfonate, sodium laurate and ammonium salt of polyoxyethylene alkyl ether sulfate), nonionic surfactants (for example, polyoxyethylene alkyl ether, polyoxyethylene alkyl ester, polyoxyethylene sorbitan fatty acid ester, polyoxyethylene alkylphenyl ether, polyoxyethylene alkylamine and polyoxyethylene alkylamide). They may be used alone or in the form of a mixture of two or more of them.

Known resin emulsions may be used as the resin emulsion, and resin emulsions described in, for example, Japanese Patent Publication No. 1426/1987, Japanese Patent Laid-Open Nos. 56573/1991, 79678/1991, 160068/1991 and 18462/1992 and the like, as such, may be used.

It is also possible to employ commercially available resin emulsions, and examples thereof include Microgel E-1002 and E-5002 (a styrene-acrylic resin emulsion manufactured by Nippon Paint Co., Ltd.), Voncoat 4001 (an acrylic resin emulsion manufactured by Dainippon Ink and Chemicals, Inc.), Voncoat 5454 (a styrene-acrylic resin emulsion manufactured by Dainippon Ink and Chemicals, Inc.), SAE1014 (a styrene-acrylic resin emulsion manufactured by Nippon Zeon Co., Ltd.) and Saivinol SK200 (an acrylic resin emulsion manufactured by Saiden Chemical Industry Co., Ltd.).

Furthermore, the ink used in the method according to the present invention may contain a component selected from saccharides and their derivatives and polyols having five or more hydroxyl groups.

According to a further preferred embodiment of the present invention, the black ink used in the method according to the present invention preferably has a contact angle with the recording medium of 70° to 113° as measured 10 sec after dropping. The term "contact angle" used herein is intended to mean an angle that, when a liquid is dropped on the surface of a solid, the tangent line to the liquid makes with the solid surface at a point of intersection of three phases of gas-liquid-solid. The contact angle in the above range is advantageous particularly when recording paper having a stockigt sizing degree of 5 sec or more is used as the recording medium. For example, the present inventors have measured the stockigt sizing degree of plain paper commonly used in ink jet recording according to Japanese Industrial Standard (JIS) 8122. As a result, for example, the stockigt sizing degree was 6 sec for 4024.3R721™ paper manufactured by Xerox Corp., 41 sec for 10.3R54™ paper manufactured by Xerox Corp., 26 sec for XEROX-P™ paper manufactured by Fuji Xerox Co., Ltd. and 25 sec for Fine PPC paper™ manufactured by Kishu Paper Co., Ltd. From these results, it is apparent that the stockigt sizing degree of recording paper commonly used in ink jet recording is 5 sec or more. Therefore, the method according to the present invention is advantageous also in that it, as such, can be applied to the conventional recording paper.

In the color ink used in the method according to the present invention, it is preferred to add a surfactant for the purpose of modifying the surface tension of the ink. Particularly preferred examples of the surfactant include acetylene glycol surfactants described in Japanese Patent Publication No. 6752/1983 and Japanese Patent Laid-Open No. 139964/1988. Specific examples of the acetylene glycol surfactants as the particularly preferred surfactant include compounds represented by the following general formula (I):

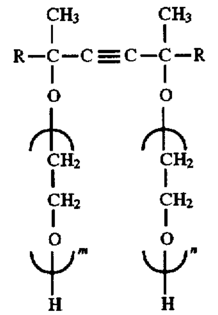

(I)

wherein R represents a $C_{1-6}$ alkyl group, preferably a methyl, ethyl, n-propyl or iso-butyl group, m and n are each 0 or an integer of 1 or more with m+n being preferably less than 30.

The amount of these surfactants added is preferably in the range of 0.01 to 10% by weight, still preferably in the range of 0.5 to 5% by weight, based on the ink. When the amount of the surfactant added is smaller than the above range, the dissolution stability and quick drying property of the ink may be unfavorably deteriorated. On the other hand, when it exceeds the above range, the ink may be become liable to foam, which often unfavorably deteriorates the quality of print and jetting stability.

According to a further preferred embodiment of the present invention, the ink used in the present invention contain an acetylene glycol in combination with a monohydric alcohol. This enables the flow of the black ink into the color ink region to be more effectively prevented, so that a sharp color image can be provided. The amount ratio of acetylene glycol to monohydric alcohol is preferably in the range of 1:1 to 1:10.

If necessary, the ink used in the method according to the present invention may includes, for example, dispersants, surfactants, viscosity modifiers, surface tension modifiers, resistivity modifiers, pH adjusters, antioxidants, fungicides, chelating agents. Although the content of these additives may be properly determined depending upon the purpose of addition, it is generally suitable for the content to be in the range of 0.01 to 5% by weight.

EXAMPLES

The present invention will now be described in more detail with reference to the following Examples and Comparative Examples, though it is not limited to these Examples.

In the Examples and Comparative Examples, "%" is "% by weight" unless otherwise noted. "Surfynol" used herein is an acetylene glycol manufactured by Nissin Chemical Industry Co., Ltd. Surfynol 82 is a compound represented by the formula (I) wherein R represents ethyl, m and n are 0 (zero), Surfynol TG a compound represented by the formula (I) wherein R represents iso-butyl and m and n are 0 (zero), Surfynol 440 a compound represented by the formula (I) wherein R represents iso-butyl and m+n=3.5, and Surfynol 465 a compound represented by the formula (I) wherein R represents iso-butyl and m+n=10.

Example A

Inks having compositions shown in Table 1 were prepared according to a conventional method. Specifically, components for constituting the compositions were mixed with one another, and the mixtures were sufficiently stirred at room temperature for dissolution and filtered with a 0.8-μm membrane filter to provide inks.

TABLE 1

| | Combination of Inks | | | | | | | |
|---|---|---|---|---|---|---|---|---|
| | I | | | | II | | | |
| Composition | Black | Yellow | Magenta | Cyan | Black | Yellow | Magenta | Cyan |
| Colorant | | | | | | | | |
| Direct Black 19 | 2.0 | | | | | | | |
| Acid Yellow 23 | | 3.0 | | | | | | |
| Acid Red 52 | | | 3.0 | | | | | |
| Acid Blue 9 | | | | 3.0 | | | | |
| Direct Black 154 | | | | | 2.0 | | | |
| Direct Yellow 86 | | | | | | 3.0 | | |
| Direct Red 227 | | | | | | | 3.0 | |
| Direct Blue 199 | | | | | | | | 3.0 |
| Solvent | | | | | | | | |
| Glycerin | 4.0 | 10.0 | 10.0 | 10.0 | 4.0 | 20.0 | 20.0 | 20.0 |
| Polyethylene Glycol #200 | | 10.0 | 10.0 | 10.0 | | | | |
| Ethanol | 5.0 | | | | | | | |
| n-Propanol | | | | | 3.0 | | | |
| Additive | | | | | | | | |
| Surfynol TG | | 0.4 | 0.4 | 0.4 | | | | |
| Surfynol 82 | | 2.0 | 2.0 | 2.0 | | | | |
| Surfynol 440 | | | | | | 1.0 | 1.0 | 1.0 |
| Proxel XL-2 | 0.3 | 0.3 | 0.3 | 0.3 | 0.3 | 0.3 | 0.3 | 0.3 |
| Ion-exchanged water | 88.7 | 74.3 | 74.3 | 74.3 | 90.7 | 75.7 | 75.7 | 75.7 |
| Surface tension (dyn/cm, 20° C.) | 57.3 | 31.2 | 30.4 | 29.7 | 50.6 | 30.4 | 29.9 | 30.0 |

| | Combination of Inks | | | | | | | |
|---|---|---|---|---|---|---|---|---|
| | III | | | | IV | | | |
| Composition | Black | Yellow | Magenta | Cyan | Black | Yellow | Magenta | Cyan |
| Colorant | | | | | | | | |
| Direct Black 154 | 2.0 | | | | | | | |
| Direct Black 168 | | | | | 2.0 | | | |
| Food Black 2 | | | | | | | | |
| Acid Red 52 | | | 2.0 | | | | | |
| Acid Red 249 | | | | | | | 3.0 | |
| Direct Red 227 | | | | | | | | |
| Acid Yellow 23 | | 3.0 | | | | 3.0 | | |
| Direct Yellow 86 | | | | | | | | |
| Acid Blue 9 | | | | 2.0 | | | | 2.5 |
| Direct Blue 199 | | | | | | | | |
| Solvent | | | | | | | | |
| Glycerin | 5.0 | 15 | 15 | 15 | | 12 | 12 | 12 |
| Diethylene glycol | | 10 | 10 | 10 | 5.0 | 10 | 10 | 10 |
| Ethylene glycol | | | | | | | | |
| Ethanol | 4.0 | | | | | | | |
| n-Propanol | | | | | 3.0 | | | |
| Additive | | | | | | | | |
| Surfynol 465 | | 1.0 | 1.0 | 1.0 | | 1.5 | 1.5 | 1.5 |
| Surfynol TG | | | | | | | | |
| Proxel XL-2 | 0.3 | 0.3 | 0.3 | 0.3 | 0.3 | 0.3 | 0.3 | 0.3 |
| Ion-exchanged water | 88.7 | 70.7 | 71.7 | 71.7 | 89.7 | 73.2 | 73.2 | 73.7 |
| Surface tension (dyn/cm, 20° C.) | 54.3 | 28.5 | 28.6 | 28.8 | 50.4 | 26.4 | 26.9 | 26.8 |

| | Combination of Inks | | | | | | | |
|---|---|---|---|---|---|---|---|---|
| | V | | | | VI | | | |
| Composition | Black | Yellow | Magenta | Cyan | Black | Yellow | Magenta | Cyan |
| Colorant | | | | | | | | |
| Direct Black 154 | | | | | 2.0 | | | |
| Direct Black 168 | 2.5 | | | | | | | |
| Food Black 2 | | | | | | | | |
| Acid Red 52 | | | | | | | | |

TABLE 1-continued

| | | | | | | | | |
|---|---|---|---|---|---|---|---|---|
| Acid Red 249 | | | 3.0 | | | | | |
| Direct Red 227 | | | | | | | 2.5 | |
| Acid Yellow 23 | | 2.5 | | | | | | |
| Direct Yellow 86 | | | | | | 2.0 | | |
| Acid Blue 9 | | | | | | | | |
| Direct Blue 199 | | | | 3.0 | | | | 3.0 |
| Solvent | | | | | | | | |
| Glycerin | 5.0 | 20 | 20 | 20 | 5.0 | 10 | 10 | 10 |
| Diethylene glycol | | 10 | 10 | 10 | | 10 | 10 | 10 |
| Ethylene glycol | | | | | 2.0 | 3 | 3 | 3 |
| Ethanol | 5.0 | | | | | | | |
| n-Propanol | | | | | 4.0 | | | |
| Additive | | | | | | | | |
| Surfynol 465 | | 1.0 | 1.0 | 1.0 | | 1.2 | 1.2 | 1.2 |
| Surfynol TG | | | | | | | | |
| Proxel XL-2 | 0.3 | 0.3 | 0.3 | 0.3 | 0.3 | 0.3 | 0.3 | 0.3 |
| Ion-exchanged water | 87.2 | 66.2 | 65.7 | 65.7 | 86.7 | 73.5 | 73.0 | 72.5 |
| Surface tension (dyn/cm, 20° C.) | 52.4 | 28.7 | 28.3 | 28.5 | 53.5 | 27.1 | 27.0 | 26.9 |

| | Combination of Inks | | | |
|---|---|---|---|---|
| | VII | | | |
| Composition | Black | Yellow | Magenta | Cyan |
| Colorant | | | | |
| Direct Black 154 | | | | |
| Direct Black 168 | | | | |
| Food Black 2 | 3.0 | | | |
| Acid Red 52 | | | 2.0 | |
| Acid Red 249 | | | | |
| Direct Red 227 | | | | |
| Acid Yellow 23 | | | | |
| Direct Yellow 86 | | 2.5 | | |
| Acid Blue 9 | | | | 2.5 |
| Direct Blue 199 | | | | |
| Solvent | | | | |
| Glycerin | | 10 | 10 | 10 |
| Diethylene glycol | 7.0 | 15 | 15 | 15 |
| Ethylene glycol | | | | |
| Ethanol | 4.0 | | | |
| n-Propanol | | | | |
| Additive | | | | |
| Surfynol 465 | | 0.8 | 0.8 | 0.8 |
| Surfynol TG | | 0.2 | 0.2 | 0.2 |
| Proxel XL-2 | 0.3 | 0.3 | 0.3 | 0.3 |
| Ion-exchanged water | 85.7 | 71.2 | 71.7 | 71.2 |
| Surface tension (dyn/cm, 20° C.) | 54.7 | 30.1 | 31.2 | 30.5 |

Evaluation of Inks

These inks were evaluated as follows by means of an ink jet recording device (manufactured by Seiko Epson Corporation, jetting nozzle: 30 μm, drive voltage of piezoelectric element: 80 V, drive frequency: 3 kHz, resolution: 360 dpi, 48 nozzles, on-demand type). The results were as given in Table 2.

Evaluation A1

A yellow ink was first printed on commercially available PPC paper (XEROX-PTM manufactured by Fuji Xerox Co., Ltd.) in 100% duty printing, and then a black ink was printed thereon. In this case, the printing was performed with the ratio of the amount of black ink to yellow ink per dot being varied as specified in Table 2.

In Comparative Example A3, the yellow ink was not printed on a portion to be printed with the black ink, that is, so that there was no portion where the black ink was printed over the yellow ink.

Bleeding due to color mixing of a black ink with a yellow ink was observed with the naked eye and evaluated as follows:

Excellent (◎)—No significant bleeding was observed,

Good (○)—Slight bleeding which did not deteriorate the whole image was observed, Slightly poor (Δ)—Significant bleeding was observed, and Poor (x)—Remarkable bleeding which deteriorated the whole image was observed.

Evaluation A2

The inks were evaluated by the time required to dry up a print that was formed in the same manner as that of Evaluation A1 to such a degree that a piece of paper that was the same as the recording paper of the print was not stained with the ink upon putting on and pressing for one second to the print. The results were evaluated according to the following criteria:

Excellent (◎)—5 sec or less,

Good (○)—5 sec to less than 30 sec,

Slightly poor (Δ)—30 sec to 1 min, and

Poor (x)—1 min or more.

Evaluation A3

A black ink was printed over a yellow ink in the same manner as that of Evaluation A1. A diameter of dot formed by the black ink was compared with diameters of dots separately formed on an identical recording paper respectively with a yellow ink, a magenta ink and a cyan ink. The results were evaluated according to the following criteria. The dot diameters of the three color inks were same as one another.

Excellent (◎)—The size of the black dot was substantially the same as that of the color dot, and Poor (x)—The size of the black dot was significantly different from that of the color dot.

TABLE 2

| | | Combination of Inks | Dot weight ratio of black ink to yellow ink | Recording method | Evaluation A1 | Evaluation A2 | Evaluation A3 |
|---|---|---|---|---|---|---|---|
| Example | A1 | I | 10:1 | Printed with black ink over yellow ink. | ○ | ○ | ◎ |
| | A2 | I | 8:1 | | ○ | ○ | ◎ |
| | A3 | I | 5:1 | | ◎ | ◎ | ◎ |
| | A4 | I | 3:1 | | ◎ | ◎ | ◎ |
| | A5 | I | 1:1 | | ○ | ◎ | ◎ |
| | A6 | II | 7:1 | | ○ | ○ | ◎ |
| | A7 | II | 4:1 | | ○ | ○ | ◎ |
| | A8 | II | 2:1 | | ◎ | ◎ | ◎ |
| | A9 | III | 6:1 | | ○ | ○ | ◎ |
| | A10 | IV | 3:1 | | ◎ | ◎ | ◎ |
| | A11 | V | 5:1 | | ◎ | ◎ | ◎ |
| | A12 | VII | 4:1 | | ◎ | ◎ | ◎ |
| | A13 | VIII | 1.5:1 | | ○ | ◎ | ◎ |
| | A14 | III | 2:1 | | ◎ | ◎ | ◎ |
| | A15 | V | 3:1 | | ◎ | ◎ | ◎ |
| | A16 | VI | 3.5:1 | | ◎ | ◎ | ◎ |
| Comparative Example | A1 | I | 15:1 | | Δ | Δ | X |
| | A2 | I | 0.5:1 | | ○ | ◎ | X |
| | A3 | I | 1:1 | not overlapped | X | X | X |
| | A4 | III | 4:1 | | X | X | X |
| | A5 | III | 5:1 | | X | X | X |
| | A6 | III | 2:1 | | X | X | X |

Example B

Inks having the following compositions were prepared.

| Black ink B1 | |
|---|---|
| Carbon black MA-100 (manufactured by Mitsubishi Kasei Corp.) | 5% |
| Polyvinyl pyrrolidone (Mw = 40,000; manufactured by Tokyo Chemical Industry Co., Ltd.) | 3% |
| Acrylic acid/acrylonitrile copolymer | 0.3% |
| Glycerin | 5% |
| Ethanol | 5% |
| Water | Balance |

Carbon black, acrylic acid/acrylonitrile copolymer and water were mixed and dispersed in a paint shaker for 30 min or more until the particle diameter was confirmed to become 1 μm or less under a microscope. Polyvinyl pyrrolidone was added to the dispersion, and they were further stirred for 30 min to mix them with each other. The dispersion was filtered under pressure with a 5-μm membrane filter to remove coarse particles. Glycerin and ethanol were added to the filtrate, and the mixture was stirred for 5 min to provide a black ink having an average particle diameter of 0.06 μm and a pH value of 7.

| Black ink B2 | |
|---|---|
| Carbon black MA-11 (manufactured by Mitsubishi Kasei Corp.) | 5% |
| Polyvinyl pyrrolidone (Mw = 160,000; manufactured by Tokyo Chemical Industry Co., Ltd.) | 3% |
| Polyoxyethylene compound | 0.5% |
| Propylene glycol | 13% |
| 1-Butanol | 8% |
| Water | Balance |

A black ink having an average pigment particle diameter of 0.08 μm was prepared in the same manner as that of the black ink B1.

| Black in B3 | |
|---|---|
| Carbon black MA-100 | 3% |
| Polyvinyl alcohol B03 (manufactured by Denki Kagaku Kogyo K.K.) | 0.5% |
| Voncoat 4001 (acrylic resin emulsion having a resin component content of 50%; manufactured by Dainippon Ink and Chemicals, Inc.) | 2% |
| Sucrose | 5% |
| Diethylene glycol | 10% |
| n-Propanol | 2% |
| Water | Balance |

All the above components except for glycerin and n-propanol were dispersed together with zirconium beads (diameter: 1.7 mm, amount: 1.5 times by weight that of the mixture) in a sand mill (manufactured by Yasukawa Seisakusho K. K.) for 2 hr. After the zirconium beads were removed, glycerin and n-propanol were added. The mixture was stirred at room temperature for 20 min. The stirred mixture was filtered through a 5-μm membrane filter to provide a black ink having an average pigment particle diameter of 0.1 μm.

| Black ink B4 | |
|---|---|
| Carbon black MA-11 | 5% |
| Styrene/acrylic acid copolymer | 0.8% |
| Microgel E-1002 | 1% |
| Sucrose | 1% |
| Ethylene glycol | 6% |
| 1-Propanol | 6% |
| Water | 80.2% |

A black ink having an average pigment particle diameter of 0.3 μm was prepared in the same manner as that of the black ink B3.

| Black ink B5 | |
|---|---|
| C.I. Direct Black 19 | 3% |
| Glycerin | 5% |
| Ethanol | 5% |
| Water | Balance |

The above components were mixed together and stirred at room temperature for 2 hr. The mixture was filtered under a pressure of 2 $kg/cm^2$ with a 0.8-μm membrane filter to provide an ink.

| Black ink B6 | |
|---|---|
| Carbon black (REVEN 150) (manufactured by Columbian Carbon Co., Ltd.) | 6% |
| Polyvinyl alcohol B03 | 6% |
| Polyethylene oxide | 0.3% |
| Polyethylene glycol | 8% |
| Water | Balance |

The average pigment particle diameter was 0.085 μm.

Color inks 1 to 4 having the following respective compositions were prepared in the same manner as that of the black ink 5. Surfynol TG and Surfynol 82 are an acetylene glycol manufactured by Nissin Chemical Industry Co., Ltd.

| Color ink B1 | |
|---|---|
| Dye | 3% |
| Diethylene glycol | 10% |
| Surfynol 82 | 3% |
| Surfynol TG | 0.5% |
| Water | Balance |

With respect to the dye in the color ink B1, C.I. Acid Yellow 23 as a yellow ink, C.I. Direct Red 9 as a magenta ink, and C.I. Direct Blue 86 as a cyan ink were employed, respectively.

| Color ink B2 | |
|---|---|
| Dye | 3% |
| Triethylene glycol | 10% |
| Surfynol 82 | 3% |
| Surfynol TG | 0.5% |
| Water | Balance |

With respect to the dye in the color ink B2, C.I. Direct Yellow 86 as a yellow ink, C.I. Acid Red 254 as a magenta ink, and C.I. Acid Blue 9 as a cyan ink were employed, respectively.

| Color ink B3 | |
|---|---|
| Dye | 3% |
| Diethylene glycol | 10% |
| Glycerin | 10% |
| Surfynol 82 | 3% |
| Surfynol TG | 0.5% |
| Water | Balance |

With respect to the dye in the color ink B3, C.I. Acid Yellow 23 as a yellow ink, C.I. Acid Red 52 as a magenta ink, and C.I. Direct Blue 199 as a cyan ink were employed, respectively.

| Color ink B4 | |
|---|---|
| Dye | 2% |
| Diethylene glycol | 10% |
| Glycerin | 15% |
| Surfynol 465 | 2% |
| Water | Balance |

With respect to the dye in the color ink B4, C.I. Direct Yellow 86 as a yellow ink, C.I. Acid Red 254 as a magenta ink, and C.I. Acid Blue 9 as a cyan ink were employed, respectively.

| Color ink B5 | |
|---|---|
| Dye | 3% |
| Diethylene glycol | 10% |
| Water | Balance |

With respect to the dye in the color ink B5, C.I. Acid Yellow 23 as a yellow ink, C.I. Acid Red 254 as a magenta ink, and C.I. Direct Blue 86 as a cyan ink were employed, respectively.

Surface Tension and Viscosity of Inks

The black inks and color inks thus obtained were subjected to measurement of surface tension at 25° C. with an HLV-ST surface tension balance (manufactured by Kyowa Interface Science Co., Ltd.) and viscosity at 20° C. with a B-type viscometer No. 1 rotor (manufactured by Tokyo Keiki Co., Ltd.). The results were as shown in Table 3.

TABLE 3

| Inks | Surface tension dyn/cm | Viscosity mPa.sec |
|---|---|---|
| Black ink B1 | 54 | 3.2 |
| Black ink B2 | 55 | 3.7 |
| Black ink B3 | 56 | 3.3 |
| Black ink B4 | 53 | 2.2 |
| Black ink B5 | 53 | 1.9 |
| Black ink B6 | 55 | 3.4 |
| Color ink B1 | | |
| Yellow ink | 27 | 1.8 |
| Magenta ink | 26 | 1.8 |
| Cyan ink | 26 | 1.9 |
| Color ink B2 | | |
| Yellow ink | 26 | 1.9 |
| Magenta ink | 26 | 1.9 |
| Cyan ink | 27 | 2.0 |

TABLE 3-continued

| Inks | Surface tension dyn/cm | Viscosity mPa.sec |
|---|---|---|
| Color ink B3 | | |
| Yellow ink | 26 | 2.6 |
| Magenta ink | 26 | 2.6 |
| Cyan ink | 26 | 2.6 |
| Color ink B4 | | |
| Yellow ink | 27 | 2.9 |
| Magenta ink | 26 | 2.9 |
| Cyan ink | 27 | 2.9 |
| Color ink B5 | | |
| Yellow ink | 63 | 1.6 |
| Magenta ink | 64 | 1.7 |
| Cyan ink | 64 | 1.6 |

Evaluation of Inks

Printing was performed with the ink jet recording device used in Evaluation A.

PPC paper (XEROX-P™ manufactured by Fuji Xerox Co., Ltd.), regenerated paper (Yamayuri™ manufactured by Honshu Paper Co., Ltd.), bond paper (Gilbert Bond™ (25% cotton paper) manufactured by Mead Corp.) and wood-free paper (OK Wood-Free Paper L™ manufactured by Oji Paper Co., Ltd.) were used as a recording paper.

The prints were evaluated as follows. The results were as shown in Table 4.

Evaluation B1

Printing was performed with the black ink alone, and the quality of the print was evaluated with the naked eye as follows:

Excellent (⊚)—Neither blurring nor feathering was observed,

Good (○)—Slight blurring or feathering was observed,

Slightly poor (Δ)—Significant blurring or feathering was observed with letters being still legible, and Poor (x)—Significant blurring or feathering was observed with letters being illegible.

Evaluation B2

Printing was performed so as for a black ink to be put on a yellow ink in the same manner as that of Evaluation A1. In this case, the amount ratio of black ink to yellow ink per dot was 2:1. The quality of the print was evaluated as follows:

Excellent (⊚)—Neither bleeding nor feathering was observed,

Good (○)—Slight bleeding or feathering was observed,

Slightly poor (Δ)—Significant bleeding or feathering was observed with letters being still legible, and Poor (x)—Significant bleeding or feathering was observed with letters being illegible.

Evaluation B3

The reflection OD value of the print provided in Evaluation B2 was measured with Macbeth OCMII (manufactured by Mcbeth), and the results were evaluated as follows:

Excellent (⊚)—OD value of 1.3 or more,

Good (○)—OD value of 1.2 to less than 1.3,

Slightly poor (Δ)—OD value of 1.1 to less than 1.2, and

Poor (x)—OD value of less than 1.1.

Evaluation B4

Color images were formed with the color inks and the black inks. The quality of the images was evaluated as follows:

High image quality (⊚)—No bleeding attributable to color mixing was observed with good color image, Good image quality (○)—Slight bleeding attributable to color mixing was observed with good color image, Slightly poor image quality (Δ)—Bleeding attributable to color mixing was observed with poor color image, and Poor image quality (x)—Remarkable bleeding attributable to color mixing was observed with poor color image.

TABLE 4

| | | Example | | | | | | | | | | | | | | | |
|---|---|---|---|---|---|---|---|---|---|---|---|---|---|---|---|---|---|
| | | B1 | B2 | B3 | B4 | B5 | B6 | B7 | B8 | B9 | B10 | B11 | B12 | B13 | B14 | B15 | B16 |
| Black ink | | B1 | B1 | B1 | B2 | B2 | B2 | B3 | B3 | B3 | B1 | B2 | B3 | B4 | B4 | B4 | B4 |
| Color ink | | B1 | B2 | B3 | B1 | B2 | B3 | B1 | B2 | B3 | B4 | B4 | B4 | B1 | B2 | B3 | B4 |
| Evaluation B1 | PPC paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Recycled paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Bond paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Wood-free paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Evaluation B2 | PPC paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Recycled paper | ○ | ○ | ○ | ○ | ○ | ○ | ○ | ○ | ○ | ○ | ○ | ○ | ○ | ○ | ○ | ○ |
| | Bond paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Wood-free paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Evaluation B3 | PPC paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Recycled paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Bond paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Wood-free paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Evaluation B4 | PPC paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Recycled paper | ○ | ○ | ○ | ○ | ○ | ○ | ○ | ○ | ○ | ○ | ○ | ○ | ○ | ○ | ○ | ○ |
| | Bond paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| | Wood-free paper | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |

| | | Comparative Example | | | | | |
|---|---|---|---|---|---|---|---|
| | | B1 | B2 | B3 | B4 | B5 | B6 |
| Black ink | | B1 | B2 | B3 | B4 | B5 | B6 |
| Color ink | | B5 | B5 | B5 | B5 | B5 | B5 |
| Evaluation B1 | PPC paper | ⊚ | ⊚ | ⊚ | ⊚ | ○ | Δ |

TABLE 4-continued

| | | | | | | | |
|---|---|---|---|---|---|---|---|
| | Recycled paper | ⊚ | ⊚ | ⊚ | ⊚ | ○ | Δ |
| | Bond paper | ⊚ | ⊚ | ⊚ | ⊚ | ○ | Δ |
| | Wood-free paper | ⊚ | ⊚ | ⊚ | ⊚ | ○ | Δ |
| Evaluation B2 | PPC paper | X | X | X | X | X | X |
| | Recycled paper | X | X | X | X | X | X |
| | Bond paper | X | X | X | X | X | X |
| | Wood-free paper | X | X | X | X | X | X |
| Evaluation B3 | PPC paper | X | X | X | X | X | X |
| | Recycled paper | X | X | X | X | X | X |
| | Bond paper | X | X | X | X | X | X |
| | Wood-free paper | X | X | X | X | X | X |
| Evaluation B4 | PPC paper | X | X | X | X | X | X |
| | Recycled paper | X | X | X | X | X | X |
| | Bond paper | X | X | X | X | X | X |
| | Wood-free paper | X | X | X | X | X | X |

Example C

Inks having compositions shown in Table 5 were prepared by a conventional method. All the numerical values in the table are % by weight.

Surface Tension and Contact Angle of Inks

The inks thus obtained were subjected to measurement of surface tension in the same manner as that of Example B.

In addition, the inks were dropped on recording paper (P paper™ manufactured by Fuji Xerox Co., Ltd.; and 4024 paper™ manufactured by Xerox Corp.), and the contact angle 10 sec after the dropping was measured with an automatic contact angle measuring device CA-Z (manufactured by Kyowa Interface Science Co., Ltd.).

The results were as shown in Table 5.

Slightly poor (Δ)—Significant blurring or feathering was observed with letters being still legible, and Poor (x)—Significant blurring or feathering was observed with letters being illegible.

Evaluation C2

Printing was performed so as for a black ink to be put on a yellow ink in the same manner as that of Evaluation A1. In this case, the amount ratio of black ink to yellow ink per dot was 2.5:1. The quality of the print was evaluated as follows:

Excellent (⊚)—Neither bleeding nor feathering was observed,

Good (○)—Slight bleeding or feathering was observed,

Slightly poor (Δ)—Significant bleeding or feathering was observed with letters being still legible, and

TABLE 5

| Composition | | Black ink C1 | C2 | C3 | C4 | C5 | C6 | C7 | Color ink C1 | C2 | C3 |
|---|---|---|---|---|---|---|---|---|---|---|---|
| Colorant | C.I. Direct Black 19 | 1.5 | 1.5 | | | | | | | | |
| | C.I. Direct Black 154 | | | 1.5 | 1.5 | | | 3.5 | | | |
| | C.I. Direct Black 168 | | | | | 1.5 | 1.0 | | | | |
| | C.I. Acid Yellow 23 | | | | | | | | 4.0 | | |
| | C.I. Direct Yellow 86 | | | | | | | | | 3.0 | 3.0 |
| Solvent | Glycerin | 5.0 | | | 5.0 | | 5.0 | | 20.0 | 10.0 | 20.0 |
| | 2-Pyrrolidone | | | | | | | | 10.0 | | |
| | Diethylene glycol | | 5.0 | 5.0 | | 5.0 | | 10.0 | | | 10.0 |
| | Polyethylene glycol #200 | | | | | | | 10.0 | | 10.0 | |
| | Diethylene glycol monobutyl ether | | | | | 5.0 | | | | | |
| | Ethanol | 5.0 | 5.0 | | 5.0 | | | | | | |
| | n-Propanol | | | 5.0 | | 3.0 | | | | | |
| Additive | Surfynol TG | | | | | | | | 0.5 | 0.5 | |
| | Surfynol 82 | | | | 0.5 | | | | 2.0 | | |
| | Surfynol 440 | | | | | | | | | 1.0 | |
| | Surfynol 465 | | | | | | | | | | 1.0 |
| | Sodium dialkysulfonsuccinate | | | | | | | 1.0 | | | |
| Preservation | Proxel XL-2 | 0.3 | 0.3 | 0.3 | 0.3 | 0.3 | 0.3 | 0.3 | 0.3 | 0.3 | 0.3 |
| Solvent | Ion-exchanged water | 88.2 | 88.2 | 88.2 | 87.7 | 85.2 | 93.7 | 75.2 | 63.2 | 75.2 | 65.7 |
| Surface tension (dyn/cm, 20° C.) | | 54 | 52 | 48 | 45 | 41 | 64 | 28 | 31 | 36 | 28 |

Evaluation of Inks

Printing was performed with the ink jet recording device used in evaluation A. The prints were evaluated as follows. The results were as shown in Table 6.

Evaluation C1

Printing was performed with the black ink alone, and the quality of the print was evaluated with the naked eye as follows:

Excellent (⊚)—Neither blurring nor feathering was observed,

Good (○)—Slight blurring or feathering was observed,

Poor (x)—Significant bleeding or feathering was observed with letters being illegible.

Evaluation C3

The inks were evaluated by the time required to dry up a print that was formed in the same manner as that of Evaluation A1 to such a degree that a piece of paper that was the same as the recording paper of the print was not stained with the ink upon putting on and pressing for one second to the print. The results were evaluated according to the following criteria:

Excellent (⊚)—5 sec or less,

Good (○)—5sec to less than 30 sec,
Slightly poor (Δ)—30 sec to 1 min, and
Poor (x)—1 min or more.

TABLE 6

| | | | | Contact angle (°) | | Evaluation C1 | | Evaluation C2 | | |
|---|---|---|---|---|---|---|---|---|---|---|
| | | Black ink | Color ink | Paper P | Paper 4024 | Paper P | Paper 4024 | Paper P | Paper 4204 | Evaluation C3 |
| Example | C1 | C1 | C1 | 112 | 110 | ◎ | ◎ | ○ | ○ | ○ |
| | C2 | C2 | C1 | 108 | 104 | ◎ | ◎ | ○ | ○ | ○ |
| | C3 | C3 | C1 | 98 | 92 | ◎ | ○ | ○ | ◎ | ◎ |
| | C4 | C4 | C2 | 89 | 88 | ○ | ○ | ◎ | ◎ | ◎ |
| | C5 | C5 | C2 | 76 | 72 | ○ | ○ | ◎ | ◎ | ◎ |
| | C6 | C1 | C3 | 112 | 110 | ◎ | ◎ | ○ | ○ | ◎ |
| | C7 | C2 | C3 | 108 | 104 | ◎ | ◎ | ◎ | ◎ | ◎ |
| | C8 | C3 | C3 | 98 | 92 | ◎ | ○ | ◎ | ◎ | ◎ |
| Comparative | C1 | C6 | C2 | 120 | 115 | ◎ | ◎ | X | X | X |
| Example | C2 | C7 | C2 | 37 | 22 | X | X | ◎ | ◎ | ◎ |

Example D

Inks having the following compositions were prepared according to a conventional method. Briefly, components were mixed and were stirred at room temperature for 2 hr and filtered with a 0.8-μm membrane filter under a pressure of 2 kg/cm$^2$ to provide the inks.

| | |
|---|---|
| Black ink D1 | |
| C.I. Direct Black 154 | 3% |
| Glycerin | 5% |
| Ethanol | 5% |
| Ion-exchanged water | Balance |
| Black ink D2 | |
| C.I. Food Black 2 | 3% |
| Triethylene glycol | 5% |
| Methanol | 5% |
| Ion-exchanged water | Balance |
| Black ink D3 | |
| C.I. Direct Black 154 | 3% |
| Diethylene glycol | 5% |
| 2-Propanol | 5% |
| Ion-exchanged water | Balance |
| Color ink D1 | |
| Dye | 3% |
| Diethylene glycol | 10% |
| Glycerin | 10% |
| Ethanol | 10% |
| Surfynol 82 | 0.5% |
| Surfynol TG | 0.5% |
| Ion-exchanged water | Balance |

With respect to the dye in the color ink D1, C.I. Acid Yellow 23 as a yellow ink, C.I. Direct Red 9 as a magenta ink, and C.I. Direct Blue 86 as a cyan ink were employed, respectively.

| Color ink D2 | |
|---|---|
| Dye | 3% |
| Triethylene glycol | 10% |
| n-Propanol | 10% |
| Surfynol 82 | 2% |
| Surfynol TG | 0.5% |

-continued

| Color ink D2 | |
|---|---|
| Ion-exchanged water | Balance |

With respect to the dye in the color ink D2, C.I. Direct Yellow 86 as a yellow ink, C.I. Acid Red 254 as a magenta ink, and C.I. Acid Blue 9 as a cyan ink were employed, respectively.

| Color ink D3 | |
|---|---|
| Dye | 3% |
| Diethylene glycol | 10% |
| Glycerin | 10% |
| Ethanol | 10% |
| Surfynol 82 | 0.8% |
| Surfynol TG | 0.4% |
| Ion-exchanged water | Balance |

With respect to the dye in the color ink D3, C.I. Direct Yellow 86 as a yellow ink, C.I. Acid Red 249 as a magenta ink, and C.I. Direct Blue 86 as a cyan ink were employed, respectively.

| Color ink D4 | |
|---|---|
| Dye | 3% |
| Triethylene glycol | 10% |
| 2-Propanol | 5% |
| Surfynol 82 | 3% |
| Surfynol TG | 0.5% |
| Ion-exchanged water | Balance |

With respect to the dye in the color ink D4, C.I. Acid Yellow 23 as a yellow ink, C.I. Acid Red 254 as a magenta ink, and C.I. Direct Blue 199 as a cyan ink were employed, respectively.

| Color ink D5 | |
|---|---|
| Dye | 3% |
| Diethylene glycol | 10% |

-continued

| Color ink D5 | |
|---|---|
| Ethanol | 25% |
| Surfynol 82 | 3% |
| Surfynol TG | 0.5% |
| Ion-exchanged water | Balance |

With respect to the dye in the color ink D5, C.I. Acid Yellow 23 as a yellow ink, C.I. Acid Red 254 as a magenta ink, and C.I. Direct Blue 86 as a cyan ink were employed, respectively.

| Color ink D6 | |
|---|---|
| Dye | 3% |
| Diethylene glycol | 10% |
| Glycerin | 10% |
| 2-Propanol | 0.5% |
| Surfynol TG | 0.4% |
| Ion-exchanged water | Balance |

With respect to the dye in the color ink D6, C.I. Acid Yellow 23 as a yellow ink, C.I. Acid Red 52 as a magenta ink, and C.I. Direct Blue 199 as a cyan ink were employed, respectively.

| Color ink D7 | |
|---|---|
| Dye | 2% |
| Diethylene glycol | 10% |
| Glycerin | 15% |
| Ethanol | 5% |
| Surfynol 465 | 1.5% |
| Ion-exchanged water | Balance |

With respect to the dye in the color ink D7, use was made of C.I. Direct Yellow 86 as a yellow ink, C.I. Acid Red 249 as a magenta ink, and C.I. Direct Blue 199 as a cyan ink.

| Color ink D8 | |
|---|---|
| Dye | 3% |
| Diethylene glycol | 10% |
| Glycerin | 10% |
| 2-Propanol | 6% |
| Surfynol TG | 0.5% |
| Ion-exchanged water | Balance |

With respect to the dye in the color ink D8, C.I. Acid Yellow 23 as a yellow ink, C.I. Acid Red 52 as a magenta ink, and C.I. Direct Blue 199 as a cyan ink were employed, respectively.

| Color ink D9 | |
|---|---|
| Dye | 3% |
| Ethylene glycol | 10% |
| Glycerin | 10% |
| n-Propanol | 2% |
| Surfynol 82 | 3% |
| Surfynol TG | 0.5% |
| Ion-exchanged water | Balance |

With respect to the dye in the color ink D9, C.I. Direct Yellow 86 as a yellow ink, C.I. Acid Red 249 as a magenta ink, and C.I. Acid Blue 9 as a cyan ink were employed, respectively.

| Color ink D10 | |
|---|---|
| Dye | 3% |
| Diethylene glycol | 10% |
| Glycerin | 10% |
| 2-Propanol | 10% |
| Ion-exchanged water | Balance |

With respect to the dye in the color ink D10, C.I. Acid Yellow 23 as a yellow ink, C.I. Acid Red 52 as a magenta ink, and C.I. Direct Blue 199 as a cyan ink were employed, respectively.

| Color ink D11 | |
|---|---|
| Dye | 3% |
| Diethylene glycol | 10% |
| Ion-exchanged water | Balance |

With respect to the dye in the color ink D11, C.I. Direct Yellow 86 as a yellow ink, C.I. Direct Red 9 as a magenta ink, and C.I. Direct Blue 199 as a cyan ink were employed, respectively.

Surface Tension and Viscosity of Inks

The inks thus obtained were subjected to measurement of surface tension and viscosity in the same manner as that of Example B. The results were as shown in Table 7.

TABLE 7

| | | Surface tension dyn/cm | Viscosity mRa.sec | Acetylene glycol: Monohydric alcohol |
|---|---|---|---|---|
| Black ink D1 | | 55 | 2.0 | |
| Black ink D2 | | 57 | 2.2 | |
| Black ink D3 | | 54 | 2.1 | |
| Color ink D1 | Yellow ink | 27 | 2.5 | 1:2.85 |
| | Magenta ink | 27 | 2.4 | |
| | Cyan ink | 28 | 2.5 | |
| Color ink D2 | Yellow ink | 27 | 2.2 | 1:4 |
| | Magenta ink | 28 | 2.3 | |
| | Cyan ink | 27 | 2.3 | |
| Color ink D3 | Yellow ink | 27 | 2.4 | 1:8.3 |
| | Magenta ink | 27 | 2.4 | |
| | Cyan ink | 27 | 2.5 | |

TABLE 7-continued

| | | Surface tension dyn/cm | Viscosity mRa.sec | Acetylene glycol: Monohydric alcohol |
|---|---|---|---|---|
| Black ink D1 | | 55 | 2.0 | |
| Black ink D2 | | 57 | 2.2 | |
| Black ink D3 | | 54 | 2.1 | |
| Color ink D4 | Yellow ink | 27 | 2.1 | 1:1.43 |
| | Magenta ink | 28 | 2.2 | |
| | Cyan ink | 28 | 2.2 | |
| Color ink D5 | Yellow ink | 26 | 2.6 | 1:7.14 |
| | Magenta ink | 27 | 2.6 | |
| | Cyan ink | 26 | 2.6 | |
| Color ink D6 | Yellow ink | 28 | 2.2 | 1:1.25 |
| | Magenta ink | 28 | 2.1 | |
| | Cyan ink | 28 | 2.1 | |
| Color ink D7 | Yellow ink | 26 | 2.9 | 1:3.3 |
| | Magenta ink | 27 | 2.9 | |
| | Cyan ink | 26 | 2.9 | |
| Color ink D8 | Yellow ink | 27 | 2.5 | 1:12 |
| | Magenta ink | 28 | 2.5 | |
| | Cyan ink | 28 | 2.4 | |
| Color ink D9 | Yellow ink | 28 | 2.3 | 1:0.57 |
| | Magenta ink | 28 | 2.2 | |
| | Cyan ink | 27 | 2.2 | |
| Color ink D10 | Yellow ink | 48 | 2.3 | |
| | Magenta ink | 46 | 2.3 | |
| | Cyan ink | 45 | 2.2 | |
| Color ink D10 | Yellow ink | 56 | 2.1 | |
| | Magenta ink | 57 | 2.0 | |
| | Cyan ink | 56 | 2.0 | |

Evaluation of Inks

Printing was performed with the ink jet recording device used in evaluation A. The prints were evaluated as follows. The results were as shown in Table 8.

Evaluation D1

Printing was performed so as for a black ink to be put on a color ink in the same manner as that of Evaluation A1. In this case, the amount ratio of black ink to yellow ink per dot was 3:1. The quality of the prints was evaluated in the same manner as that described in connection with evaluation A1.

Evaluation D2

Color images were formed using the color inks and the black inks in the same manner as that of evaluation B4. The quality of the images was evaluated in the same manner as that described in connection with evaluation B4.

TABLE 8

| | Black ink | Color ink | Evaluation D1 | Evaluation D2 |
|---|---|---|---|---|
| Example | | | | |
| D1 | D1 | D1 | ⊚ | ⊚ |
| D2 | D2 | D2 | ⊚ | ⊚ |
| D3 | D3 | D3 | ⊚ | ⊚ |
| D4 | D1 | D4 | ⊚ | ⊚ |
| D5 | D2 | D5 | ⊚ | ⊚ |
| D6 | D3 | D6 | ⊚ | ⊚ |
| D7 | D1 | D7 | ⊚ | ⊚ |
| D8 | D1 | D8 | ○ | ○ |
| D9 | D2 | D9 | ○ | ○ |
| Comparative Example | | | | |
| D1 | D1 | D10 | x | x |
| D2 | D3 | D11 | x | x |

What is claimed is:

1. A color ink jet recording method for printing on a recording medium containing a portion to be rendered black and a color portion, the portion to be black being in contact with the color portion in a color image to be formed, said method comprising the steps of:

a) printing first at least one color ink on a subportion of the portion to be black which subportion is in contact with the color portion on the recording medium, whereby the portion to be black is partially printed with the at least one color ink, b) printing a black ink on the portion to be black which is partially printed with the at least one color ink according to the previous step, said at least one color ink having a surface tension at 20° C. of less than 40 dyn/cm and the black ink having a surface tension at 20° C. of 40 dyn/cm or more.

2. The recording method according to claim 1, wherein said at least one color ink is selected from the group consisting of yellow, magenta and cyan inks.

3. The recording method according to claim 1, wherein the weight ratio of black ink to color ink per dot printed is in the range of 10:1 to 1:1.

4. The recording method according to claim 1, wherein said black ink contains 0.5 to 10% by weight of a monohydric alcohol and 0.5 to 15% by weight of a polyhydric alcohol.

5. The recording method according to claim 1, wherein said black ink has the contact angle with the recording medium is in the range of 70° to 113° as measured 10 sec after dropping.

6. The recording method according to claim 1, wherein said black ink comprises a pigment as a colorant and said color ink comprises a water-soluble dye as a colorant.

7. The recording method according to claim 1, wherein said color ink comprises acetylene glycol.

8. The recording method according to claim 7, wherein said color ink comprises a monohydric alcohol and an acetylene glycol in a weight ratio of acetylene glycol to monohydric alcohol of 1:1 to 1:10.

* * * * *